United States Patent [19]

Bakker

[11] 3,821,463

[45] June 28, 1974

[54] ELECTROMAGNETIC SHIELDING MATERIAL

[75] Inventor: Wilem F. Bakker, Piscataway, N.J.

[73] Assignee: Metex Corporation, Edison, N.J.

[22] Filed: Mar. 7, 1972

[21] Appl. No.: 232,584

Related U.S. Application Data

[62] Division of Ser. No. 17,121, March 6, 1970, abandoned.

[52] U.S. Cl. .............................. 174/35 MS, 98/121
[51] Int. Cl. ............................................ H05k 9/00
[58] Field of Search ..... 174/35 MS, 35 GC; 161/68; 98/121

[56] References Cited

UNITED STATES PATENTS

| | | | |
|---|---|---|---|
| 3,231,663 | 1/1966 | Schwartz | 174/35 MS |
| 3,546,359 | 12/1970 | Ciccarelli et al. | 174/35 MS |
| 3,584,134 | 6/1971 | Michols et al | 174/35 MS |

FOREIGN PATENTS OR APPLICATIONS

| | | | |
|---|---|---|---|
| 768,996 | 2/1957 | Great Britain | 174/35 MS |

*Primary Examiner*—Darrell L. Clay
*Attorney, Agent, or Firm*—Bierman & Bierman

[57] ABSTRACT

The electromagnetic shielding material is comprised of at least a first layer and a second layer, each layer being composed of a honeycomb material having a longitudinal axis. The longitudinal axis of the second layer is disposed at an angle relative to the longitudinal axis of the first layer of greater than 0° but less than 180°.

7 Claims, 3 Drawing Figures

INVENTOR.
WILLEM F. BAKKER
BY
BIERMAN & BIERMAN
ATTORNEYS

ELECTROMAGNETIC SHIELDING MATERIAL

This application is a division of application Ser. No. 17,121, filed Mar. 6, 1970, now abandoned.

This invention relates to electromagnetic shielding materials. More particularly, it relates to omnidirectional electromagnetic shielding materials.

The use of shielding material to protect electric and electronic devices from energy disturbances is well known. The shields heretofore proposed offer protection against electromagnetic radiation, although such protection is known to vary in accordance with the nature of the electromagnetic radiation as well as with respect to its orientation. For example, some shields offer protection against unidirectional magnetic fields, as, for example, the earth's magnetic field, but offer little if any protection against magnetic and electric fields set up by alternating current flow. The orientation of the impinging electromagnetic field has heretofore greatly affected the extent of protection afforded by the shielding material. In essence, the protecting devices have been predominantly unidirectional.

Materials which have attempted to achieve nondirectional protection for electronic devices have generally been cumbersome, difficult to fabricate and expensive. In response to the demand for lighter and inexpensive shielding materials, metal honeycomb structures have been used, made out of, for example, steel or brass. These materials, however, have had limited application because the protection they offer is essentially unidirectional.

Accordingly, it is an object of this invention to provide a shielding material which is omnidirectional. It is a further object of this invention to provide a shielding material which is light, inexpensive and easy to fabricate.

The material of the present invention consists of a layered honeycomb structure, preferably aluminum, wherein the layers of the honeycomb are oriented at an angle greater than 0° but less than 180° relative to their respective longitudinal axes. Preferably, the layers should be oriented at an angle of 90° relative to each other.

The present invention will be more fully understood from the description when read in conjunction with the accompanying drawings in which.

Figure 1:
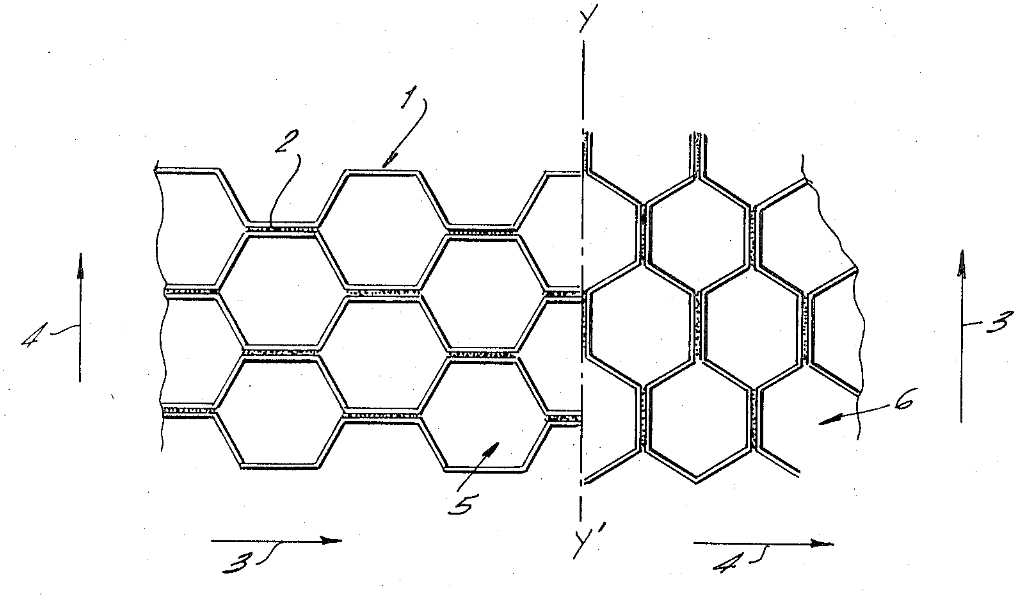
FIG. 1 is a plan view of the top layer of the honeycomb structure partially cut away along the line Y—Y'.
Figure 2:
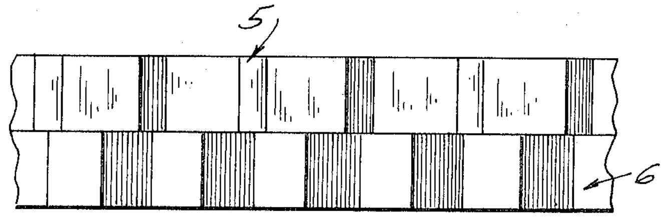
FIG. 2 is a side view of the top and bottom layers of the honeycomb structure.
Figure 3:
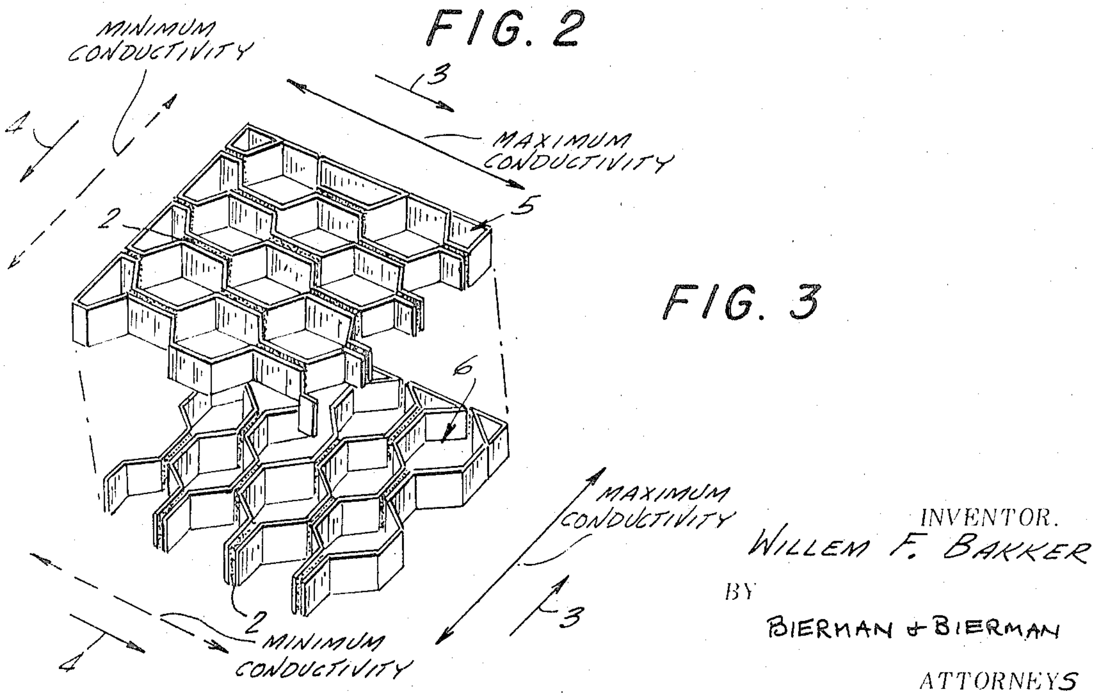
FIG. 3 is a view, in perspective, of the adjacent layers embodied in FIGS. 1 and 2.

Metal foil 1 is shaped into a honeycomb structure by the use of adhesive 2. The longitudinal axis 3 is in the direction of the foil and in the direction of the continuous metal path. The longitudinal axis therefore runs along the direction of greater conductivity. The latitudinal axis 4 is in the direction running across the non-conductive adhesion bonds and therefore is in the direction of lower conductivity. The top layer 5 is oriented at 90° relative to bottom layer 6 with respect to their longitudinal axes.

The non-uniform shielding effect of a single honeycomb layer is due to its non-uniform conductivity. As a result, any electromagnetic field which is polarized so that induced currents flow in the direction of the longitudinal axis, namely in the direction of higher conductivity, will be better shielded. The effect of the multilayer structure of the present invention is to impart equal conductivity to both directions of the material. The material is therefore no longer sensitive to the orientation of the impinging electromagnetic field. It is this "layering" effect therefore which converts an essentially unidirectional shielding material into one which is omnidirectional or non-directional.

The material of the present invention has use in many areas of application. Its use as a shielded ventilation panel is particularly noteworthy. Because of its relatively open structure, air can freely move within and throughout the honeycomb material. Yet at the same time the honeycomb structure prevents the leakage of radio waves through the shielded panel. In short, it may be used for any application requiring lightweight, omnidirectional protection against electromagnetic radiation.

What is claimed is:

1. In an enclosed environment subject to electromagnetic radiation and having an opening therein, the improvement comprising means in said opening for shielding said environment comprising at least a first conductive layer and a second conductive layer, said first layer and second layer comprising a honeycomb material having a longitudinal axis, said layers each having better conductivity along the longitudinal axis then along the transverse axis, said longitudinal axis of said second layer being disposed at an angle relative to the longitudinal axis of said first layer of greater than 0° but less than 180°, each said layer comprising a plurality of metallic corrugated sheets placed one adjacent the other to form each said layer, a non-conductive adhesive between selected areas of adjacent sheets joining said sheets together forming said honeycomb layer, said adhesive reducing conductivity along the transverse axis of said honeycomb layer.

2. The environment as in claim 1 wherein said honeycomb material is aluminum.

3. The environment as in claim 1 wherein said angle is 90°.

4. The environment as in claim 1 comprising a multiplicity of adjacent layers, the longitudinal axis of each layer being oriented at an angle, relative to the longitudinal axes of immediately adjacent layers, of greater than 0° but less than 180°.

5. The environment as in claim 1 wherein said honeycomb material is steel.

6. The environment as in claim 1 wherein said honeycomb material is brass.

7. In an enclosed environment subject to electromagnetic radiation and having an opening therein, the improvement comprising means in said opening for reducing radiation entry into said environment, said means comprising at least a first conductive layer and a second conductive layer, said first layer and said second layer composed of an electroconductive honeycomb material having a longitudinal axis, said layers each having better conductivity along the longitudinal axis than along the transverse axis, said longitudinal axis of said second layer being disposed at an angle relative to the longitudinal axis of said first layer of greater than 0° but less than 180°, each of said honeycomb layers comprising a plurality of corrugated sheets placed one adjacent the other to form each said layer, a non-conductive adhesive between selected areas of adjacent sheets joining said sheets together to form said honeycomb layer, said adhesive reducing conductivity along the transverse axis of said honeycomb layer, said honeycomb layers being placed one on the other with the cells forming the honeycomb of one layer being placed over the cells of another layer.

* * * * *